(12) United States Patent
Ikegawa et al.

(10) Patent No.: US 8,545,191 B2
(45) Date of Patent: Oct. 1, 2013

(54) WATER PUMP FOR VEHICLE

(75) Inventors: Atsutoshi Ikegawa, Nagoya (JP); Masanobu Matsusaka, Handa (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 283 days.

(21) Appl. No.: 13/042,922

(22) Filed: Mar. 8, 2011

(65) Prior Publication Data
US 2011/0236230 A1     Sep. 29, 2011

(30) Foreign Application Priority Data

Mar. 25, 2010 (JP) ................. 2010-070949
Feb. 15, 2011 (JP) ................. 2011-029799

(51) Int. Cl.
| F04B 49/00 | (2006.01) |
| F04B 35/00 | (2006.01) |
| F16D 13/04 | (2006.01) |
| F16H 9/00 | (2006.01) |

(52) U.S. Cl.
USPC ............ 417/223; 417/319; 192/40; 192/84.1; 424/69

(58) Field of Classification Search
USPC .............. 417/223, 319; 192/35, 40, 84.1; 474/69
See application file for complete search history.

(56) References Cited

U.S. PATENT DOCUMENTS

| 3,137,236 | A | * | 6/1964 | Aschaner ................. 417/223 |
| 4,460,076 | A | * | 7/1984 | Yamada .................. 192/35 |
| 5,967,274 | A | | 10/1999 | Leone et al. |
| 6,343,680 | B1 | | 2/2002 | Hakamada et al. |
| 7,207,910 | B2 | * | 4/2007 | Dell et al. ................ 474/74 |
| 8,177,669 | B2 | * | 5/2012 | Ishida et al. ............. 474/94 |
| 2010/0122882 | A1 | | 5/2010 | Komorowski et al. |
| 2011/0236231 | A1 | | 9/2011 | Ikegawa |
| 2012/0111688 | A1 | | 5/2012 | Komai et al. |

FOREIGN PATENT DOCUMENTS

| JP | 57-107440 A | 7/1982 |
| JP | 60-164022 A | 8/1985 |
| JP | 3-028527 A | 2/1991 |
| JP | 03-030522 U | 3/1991 |
| JP | 8-002423 Y2 | 1/1996 |
| JP | 11-201191 A | 7/1999 |
| JP | 2001-200860 A | 7/2001 |
| WO | 2010/054487 A1 | 5/2010 |

OTHER PUBLICATIONS

Extended European Search Report dated Dec. 18, 2012, issued by the European Patent Office in the corresponding European Patent Application No. 11155361.6. (7 pages).

* cited by examiner

*Primary Examiner* — Charles Freay
(74) *Attorney, Agent, or Firm* — Buchanan Ingersoll & Rooney PC

(57) ABSTRACT

A water pump for a vehicle includes a power transmitting member, a driven shaft rotated independently from the power transmitting member, an impeller, a biasing member for pressing an inner circumferential surface of the power transmitting member and for rotating in order to transmit a rotation of the power transmitting member to the driven shaft when the biasing member contacts the inner circumferential surface, and a control member for allowing the power transmitting member and the biasing member to come in contact with each other or to come out of contact from each other and for controlling a contacting state between the power transmitting member and the biasing member.

14 Claims, 6 Drawing Sheets

WATER PUMP FOR VEHICLE

CROSS REFERENCE TO RELATED APPLICATIONS

This application is based on and claims priority under 35 U.S.C. §119 to Japanese Patent Application 2010-070949, filed on Mar. 25, 2010 and Japanese Patent Application 2011-029799, filed on Feb. 15, 2011, the entire content of which is incorporated herein by reference.

TECHNICAL FIELD

This disclosure relates to a water pump for a vehicle having a mechanism for controlling rotation of an impeller.

BACKGROUND DISCUSSION

What is required for a water pump for a vehicle for circulating coolant to each component of a vehicle, for example to an internal-combustion engine, is to vary a supplying amount of the coolant as needed by applying a clutch mechanism to the water pump.

For example, a known water pump disclosed in JP11-201191A includes a clutch mechanism configured by a wrap spring arranged about an input hub and an output shaft, a friction member connected to one of the input hub and the output shaft for rotating therewith, an armature connected to the wrap spring and an actuator for selectively causing the friction member and the armature to frictionally engage each other, where the clutch mechanism selectively causes the wrap spring to frictionally engage the input hub or the output shaft in accordance with the frictional engagement between the friction member and the armature.

Further, another known water pump disclosed in JPH8-002423Y includes a clutch mechanism configured by a solenoid, a pulley, an inner coupling member, an outer coupling member, an armature plate and a friction plate. The solenoid is fixed on an outer circumferential surface of an end portion of a bearing housing by a bracket. The pulley is freely rotatably supported via a bearing at an outer circumferential surface of an end portion of a driving shaft of the water pump, the driving shaft being freely rotatably inserted into the bearing housing. The inner coupling member is freely rotatably supported via the bearing at the outer circumferential surface of the end portion of the driving shaft. The outer coupling member, arranged so as to face the inner coupling member via viscosity fluid, is fixed at the outer circumferential surface of the end portion of the driving shaft. The armature plate, made of a magnetic material and facing the solenoid via the pulley, is fixed at the outer coupling member. The friction plate is attached to a side surface of the armature plate at the side of the pulley.

Because each of the abovementioned clutch mechanisms has a complicated structure and is large in size, in a case where such clutch mechanism is applied to the water pump, the size of the pump itself may be increased.

According to the clutch mechanism disclosed in JP11-201191A, because some components are provided between the actuator and the armature, a structure of the clutch mechanism becomes complicated, accordingly a number of air gaps need to be provided. However, because of the air gaps, electromagnetic force generated by the actuator partially acts so as to attract the armature, accordingly the level of affectivity of the electromagnetic force may be decreased.

Furthermore, according to the electromagnetic clutch disclosed in JPH8-002423Y, a clutch force used for a torque transmission is set depending on the attracting force of the solenoid. In a case where such electromagnetic clutch is applied to the water pump, because the level of the clutch force needs to be increased when the engine is rotated in a high speed, power of the solenoid needs to be increased. In a case where a large electromagnetic clutch is actuated, high electric current is applied to the electromagnetic clutch, and such water pump is increased in size, thereby deteriorating mountability to the vehicle and increasing costs thereof.

A need thus exists to provide a water pump, which is not susceptible to the drawback mentioned above.

SUMMARY

According to an aspect of this disclosure, a water pump for a vehicle includes a power transmitting member rotationally driven by an external force, a driven shaft driven to be rotatable independently from the power transmitting member, an impeller to which a rotation of the driven shaft is transmitted, a biasing member for pressing an inner circumferential surface of the power transmitting member so as to be contactable and for rotating in order to transmit a rotation of the power transmitting member to the driven shaft when the biasing member contacts the inner circumferential surface of the power transmitting member, the biasing member being formed so as to be wound in a circumferential direction of the power transmitting member and a control member for allowing the power transmitting member and the biasing member to come in contact with each other or to come out of contact from each other and for controlling a contacting state between the power transmitting member and the biasing member.

According to another aspect of a water pump for a vehicle includes a power transmitting member rotationally driven by an external force, a driven shaft driven to be rotatable independently from the power transmitting member, an impeller to which a rotation of the driven shaft is transmitted, a biasing member for pressing an inner circumferential surface of the power transmitting member so as to transmit a rotation of the power transmitting member to the driven shaft and a controlling member for controlling a pressing force of the biasing member applied to the inner circumferential surface of the power transmitting member, wherein the biasing member is formed so as to be wound in a circumferential direction of the power transmitting member, and the controlling member changes a length of the biasing member in a radial direction of the biasing member in order to allow the inner circumferential surface of the power transmitting member and the biasing member to come in contact with each other or to come out of contact from each other.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A water pump 1 for a vehicle of a first embodiment will be explained with reference to FIGS. 1 through 4.

Figure 1:
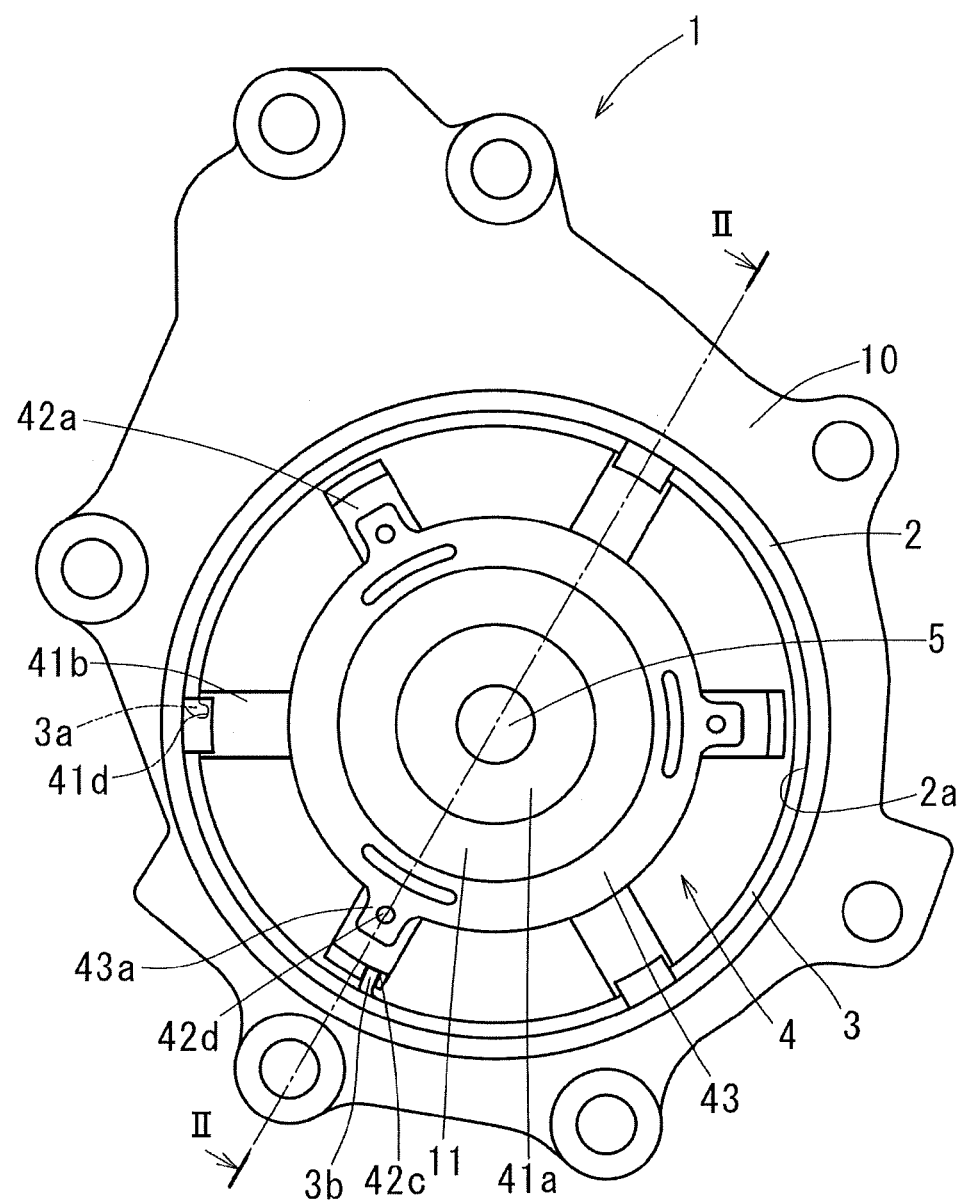
FIG. 1 is a detailed diagram indicating a configuration of each components of a water pump for a vehicle of the first embodiment.

FIG. 1 is a diagram for indicating a configuration of the water pump 1 (hereinafter simply referred to as a water pump 1) of the first embodiment. As a matter of practical convenience, a pulley 2 (e.g., a power transmitting member) is partially shown in FIG. 1, specifically a cylindrical wall portion of the pulley 2 is only illustrated in FIG. 1. The water pump 1 is configured by a pump housing 10, the pulley 2, a driven shaft 5, a wrap spring 3 (e.g., a biasing member), a controlling member 4 and a first bearing 11. The pump housing 10 includes an inlet and an outlet through which a coolant flows, and the pulley 2 is driven so as to rotate by a driving force generated at an internal-combustion engine. The driven shaft 5 is provided independently from the pulley 2 so as to be rotatably independently from the pulley 2. The wrap spring 3 is formed so as to be wound in a circumferential direction of the pulley 2 in order to press an inner circumferential surface 2a of the pulley 2, so that the wrap spring 3 is contactable to the inner circumferential surface 2a of the pulley 2, thereby transmitting the rotation of the pulley 2 to the driven shaft 5. The controlling member 4 includes a driver 41 (illustrated in FIG. 2) and an armature 42 (e.g., a magnetically-attracted portion) (illustrated in FIG. 2), each of which is used for controlling the wrap spring 3 so that the wrap spring 3 and the inner circumferential surface 2a of the pulley 2 come in contact with each other or come out of contact from each other and is used for controlling a contacting state (a degree of the contact, for example a half-clutch state) between the pulley 2 and the wrap spring 3. The first bearing 11 is provided at an outer circumferential surface of a protruding portion 41a of the driver 41.

Figure 2:
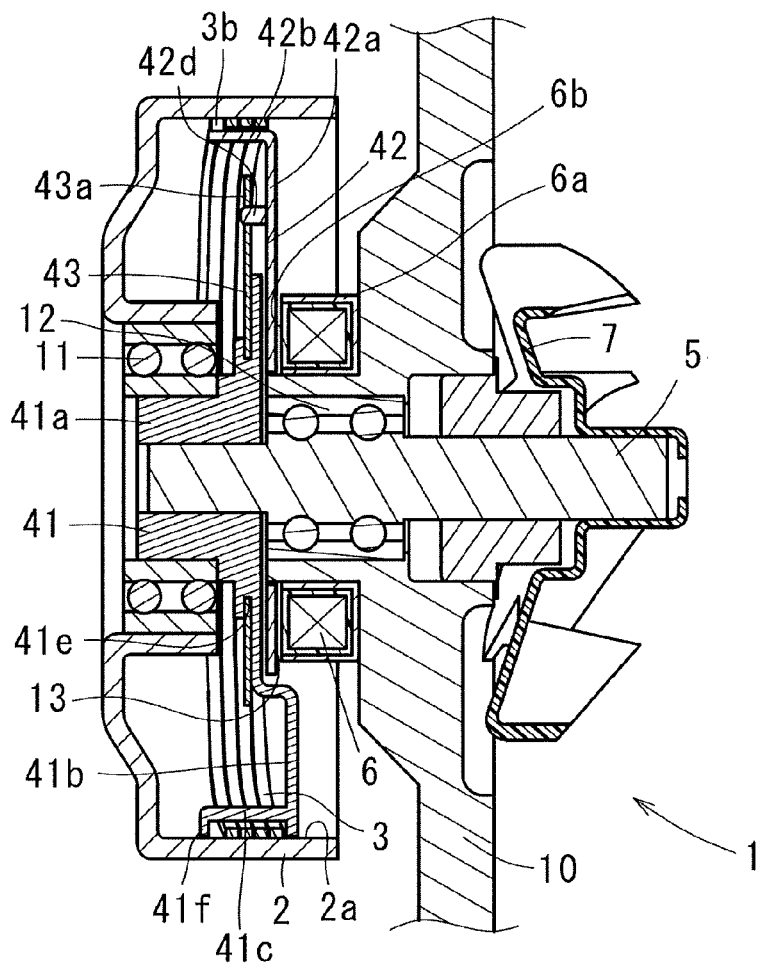
FIG. 2 is a cross sectional view of the water pump of the first embodiment, taken along II-II line in FIG. 1.

FIG. 2 is a cross sectional view of the water pump 1 of the first embodiment, taken along II-II line in FIG. 2. The water pump 1 further includes an electromagnetic coil 6 (e.g., a driving portion), the driver 41, the armature 42, a plate spring 43, a core 6a, the first bearing 11, a second bearing 12 and an impeller 7. The electromagnetic coil 6 controls the contacting state between the inner circumferential surface 2a of the pulley 2 and the wrap spring 3 so as to be in an engaging state or a disengaging state. In other words, the electromagnetic coil 6 controls the wrap spring 3 so that the wrap spring 3 and the inner circumferential surface 2a of the pulley 2 come in contact with each other or come out of contact from each other. The driver 41 is provided at one end of the driven shaft 5, and a first end portion 3a of the wrap spring 3 (indicated in FIG. 1) is connected to the driver 41 so that the rotation of the pulley 2 is transmitted to the driven shaft 5. The armature 42 is provided so as to face the electromagnetic coil 6, and when the electromagnetic coil 6 is energized, the armature 42 is attracted toward the driven shaft 5 by the electromagnetic coil 6 and fixed thereat. A second end portion 3b of the wrap spring 3 is connected to the armature 42. The plate spring 43 is provided between the driver 41 and the armature 42 in order to bias the armature 42 so as to be detached from the electromagnetic coil 6. The core 6a includes an attraction face 6b (e.g., an acting surface) functioning so as to fix the electromagnetic coil 6 within the pump housing 10 in order to attract and fix the armature 42 thereto. The first bearing 11 is provided between the pulley 2 and the protruding portion 41a of the driver 41. The second bearing 12 is provided between the driven shaft 5 and the pump housing 10. The impeller 7 is provided at the second end of the driven shaft 5.

The driver 41 includes a plurality of first projecting portions 41b, a plurality of wall portions 41c, a connecting portion 41d (FIG. 1) and a recessed portion 41e. The first projecting portions 41b are formed so as to extend toward the inner circumferential surface 2a of the pulley 2. Each of the first projecting portions 41b is formed with the wall portion 41c at which a radially variable range of the wrap spring 3 is regulated. The radially variable range is a range within which the wrap spring 3 varies from the contacting state to the disengaging state relative to the pulley 2. The connecting portion 41d (FIG. 1), provided at one of the first projecting portions 41b, is connected to the first end portion 3a of the wrap spring 3. The plate spring 43 is provided at the recessed portion 41e of the driver 41 so as to be inserted therein. The wall portion 41c of the driver 41 is shaped in such a way that each of end portions 41f of the wall portions 41c extends toward the inner circumferential surface 2a of the pulley 2, and the wrap spring 3 is provided within a space defined by the end portions 41f, the wall portion 41c and the first projecting portion 41b, so that an extension of the wrap spring 3 in the axial direction of the driven shaft 5 is regulated.

The armature 42 includes a plurality of second projecting portions 42a, a plurality of wall portions 42b each of which is formed at each of the second projecting portions 42a, a connecting portion 42c (FIG. 1), a plurality of protruding portions 42d each of which is formed on each of the second projecting portions 42a. Each of the second projecting portions 42a is formed so as to extend toward the inner circumferential surface 2a of the pulley 2, each of the wall portions 42b functions so as to regulate the radially variable range of the wrap spring 3. The connecting portion 42c, formed at one of the wall portions 42b of the second projecting portions 42a, is connected to the second end portion 3b of the wrap spring 3. The protruding portion 42d is formed at each of the second projecting portions 42a and is connected to the plate spring 43.

The plate spring 43 includes a plurality of third projecting portions 43a formed so as to extend toward the inner circumferential surface 2a of the pulley 2. Each of the third projecting portions 43a is connected to the each of the protruding portions 42d of the armature 42. Because the plate spring 43 biases the armature 42 so as to be detached from the electromagnetic coil 6, an air gap 13 is formed between the armature 42 and the attraction face 6b of the electromagnetic coil 6. The air gap 13 is configured by layers of air.

Because the air gap 13 is provided between the armature 42 and an entire attraction face 6b, the attracting force generated at the attraction face 6b by the electromagnetic coil 6 effectively acts on the armature 42. In other words, because the attracting force is a magnetic force generated by the electromagnetic coil 6, a level of efficiency of the magnetic force may be increased compared to a case where a component or the like is partially positioned between the armature 42 and the attraction face 6b of the electromagnetic coil 6. Further, because the attraction face 6b entirely faces the armature 42, and the air gap 13 is provided between the armature 42 and the attraction face 6b, the electromagnetic force generated at the electromagnetic coil 6 effectively acts on the entire armature 42. Because of the electromagnetic force acting on the entire armature 42, the armature 42 may be moved in an axial direction of the driven shaft 5 in a manner where the armature 42 postures orthogonally to the axial direction of the driven shaft 5. For example, in a case where the electromagnetic force intensively acts on one end portion of the armature 42, in which the armature 42 may move in the axial direction of the driven shaft 5 in a manner where the armature 42 inclines relative to the axial direction of the driven shaft 5. In this state, a level of responsiveness to control the rotational state of the armature 42 may be decreased compared to the first embodiment, where the electromagnetic force of the electromagnetic coil 6 acts on the entire armature 42. According to the first embodiment, because the armature 42 may smoothly move in the axial direction of the driven shaft 5, the contacting state between the pulley 2 and the wrap spring 3 may be switched to the disengaging state with high accuracy, at the same time the contacting state between the pulley 2 and the wrap spring 3 may be controlled with high accuracy, accordingly the water pump having such configuration may be easily adapted to a vehicle with high reliability.

Figure 3:
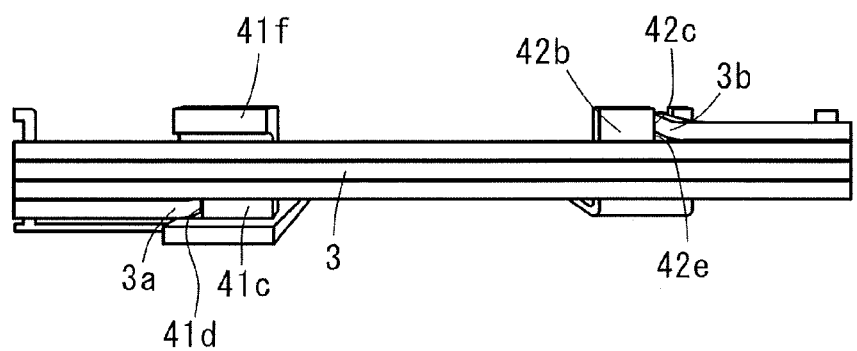
FIG. 3 is a side view of a controlling member of the water pump of the first embodiment.

FIG. 3 is a side view of the controlling member 4 of the water pump 1 of the first embodiment. The wrap spring 3 is formed so as to round along the inner circumferential surface 2a of the pulley 2 in a rotational direction (e.g., a circumferential direction) of the pulley 2. The wrap spring 3 is connected to the connecting portion 41d of the driver 41 and the connecting portion 42c of the armature 42. The connecting portion 41d of the driver 41 is formed at the wall portion 41c of the driver 41 at the side of the impeller 7 in the axial direction of the driven shaft 5 as illustrated in FIG. 3, so that a length in a radial direction of the wrap spring 3 may be easily changed when the rotational state of the driver 41 is changed to a non-rotating state. The connecting portion 42c of the armature 42 is formed at the wall portion 42b of the armature 42 at the side of the first bearing 11 in the axial direction of the driven shaft 5 as illustrated in FIG. 3. The connecting portion 42c is formed so as to include a recessed portion 42e at one end of the wall portion 42b through which the second end portion 3b of the wrap spring 3 is inserted. Accordingly, the length in the radial direction of the wrap spring 3 may be easily changed when the rotational state of the armature 42 is changed to the non-rotating state. While the first end portion 3a of the wrap spring 3 is connected to the connecting portion 41d of the driver 41, and the second end portion 3b of the wrap spring 3 is connected to the connecting portion 42c of the armature 42, the wrap spring 3 is formed so as to be wound in a spiral manner.

Figure 4A:
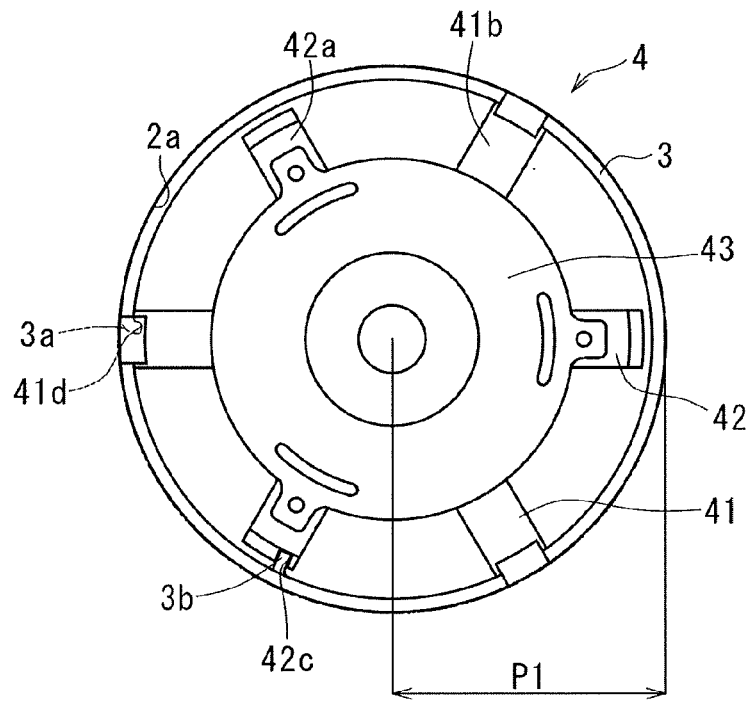
FIG. 4 is a detailed view indicating an actuation of the controlling member of the water pump of the first embodiment.
Figure 4B:
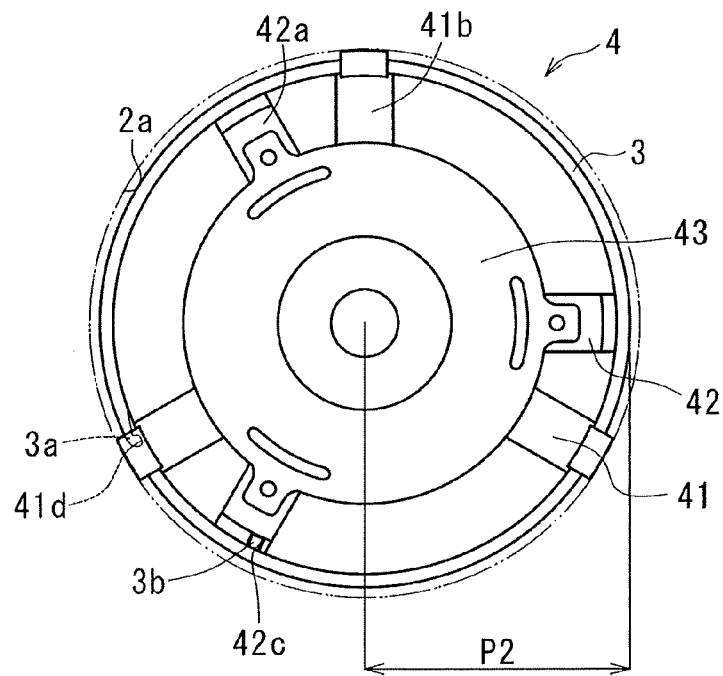

FIGS. 4A and 4B are detailed views indicating an actuation of the controlling member 4 of the water pump 1.

FIG. 4A indicates a state of the controlling member 4 when the water pump 1 is driven. When the water pump 1 is driven, the driver 41 and the armature 42 are rotatable, and the wrap spring 3 biases itself toward the inner circumferential surface 2a of the pulley 2, accordingly the inner circumferential surface 2a of the pulley contacts the wrap spring 3. When the inner circumferential surface 2a of the pulley 2 contacts the wrap spring 3, the electromagnetic coil 6 may control the rotational state of the armature 42 by attracting the armature 42, thereby controlling the rotational state of the driver 41. By controlling the rotational state of the driver 41, the pressing force of the wrap spring 3 applied to the inner circumferential surface 2a of the pulley 2 is controlled, accordingly the contacting state between the inner circumferential surface 2a of the pulley 2 and the wrap spring 3 is controlled.

FIG. 4B indicates a state of the controlling member 4 when the water pump 1 is stopped. When the water pump 1 is stopped, the electromagnetic coil 6 attracts and fixes the armature 42. Because the armature 42 connected to the plate spring 43 is fixed by the electromagnetic coil 6, the driver 41, the armature 42 and the plate spring 43 are frictionally in contact with each other. Because of the friction force between the armature 42 and the plate spring 43, the driver 41 is fixed in such a way that the inner circumferential surface 2a is detached from the wrap spring 3. At this point, the driver 41 is fixed in a state where the connecting portion 41d is rotated toward the connecting portion 42c from the position indicated in FIG. 4A. Accordingly, the driver 41 and the armature 42 are fixed in such a way that the length in the radial direction of the wrap spring 3 is shrunk from P1 to P2 in FIGS. 4A and 4B.

The actuation of the water pump 1 of the first embodiment will be explained. The pulley 2, the driver 41 and the armature 42 are rotatable in a counterclockwise direction in FIGS. 4A and 4B.

The water pump 1 is driven or stopped in accordance with a warming state of each of components of the vehicle, such as the internal-combustion engine. For example, in a case where a temperature of the engine is relatively low, the water pump 1 is stopped in order to stop the coolant circulation, thereby executing the heating of the engine. On the other hand, in a case where the temperature of the engine is relatively high, the water pump 1 is driven in order to circulate the coolant, thereby maintaining the temperature of the engine to reach an appropriate level. The appropriate level of the temperature of the engine is differently set to each type of vehicles.

When the water pump 1 is driven (an initial state), the electromagnetic coil 6 is in a stopping state (non-energized state), and as indicated in FIG. 4A, the driver 41 and the armature 42 are rotatable, and the wrap spring 3 biases itself so as to extend toward the inner circumferential surface 2a of the pulley 2. In this state, the inner circumferential surface 2a of the pulley 2 contacts the wrap spring 3, and the rotation of the pulley 2 is transmitted to the driver 41. The rotation of the driver 41 is transmitted to the impeller 7 via the driven shaft 5. When the pulley 2 contacts the wrap spring 3, and the pulley 2 rotates in synchronization with the wrap spring 3, by virtue of a pressing force made by a total force of the biasing force of the wrap spring 3 and a centrifugal force acting on the wrap spring 3, the engagement between the pulley 2 and the wrap spring 3 may be strong. Further, in a case where the engagement between the pulley 2 and the wrap spring 3 is in the half-clutch state, although the wrap spring 3 rotates slidingly relative to the pulley 2, the rotation of the pulley 2 may be transmitted to the wrap spring 3, accordingly a rotational force whose level is smaller than the rotation of the pulley 2 is transmitted to the impeller 7.

In order to turn the water pump 1 being in the driving state to the stopping state, the electromagnetic coil 6 is turned to an actuating state (an energized state) so as to attract the armature 42 by a magnetic force, so that the armature 42 is in contact to and fixed by the attraction face 6b of the electromagnetic coil 6. After the armature 42 is fixed, because the driver 41 and the wrap spring 3 keep rotating in accordance with an inertia force, as indicated in FIG. 4B, the first projecting portion 41b of the driver 41 being in the state indicated in FIG. 4A is rotated toward the second projecting portion 42a of the armature 42. Then, in a state where the second end portion 3b of the wrap spring 3 is fixed, because the wrap spring 3 is rotated in such a way that the first end portion 3a of the wrap spring 3 comes closer to the second end portion 3b, a wounding angle of the wrap spring 3 is increased. As indicated in FIGS. 4A and 4B, the wrap spring 3 is detached from the inner circumferential surface 2a of the pulley 2 toward the rotating shaft of the pulley 2 by a distance that is equal to a difference between P1 and P2 in FIGS. 4A and 4B, accordingly the rotation of the pulley 2 is not transmitted to the impeller 7, thereby stopping the water pump 1.

When the water pump 1 being in the stopping state turns to the driving state, the electromagnetic coil 6 is stopped (non-energized), and the armature 42 is detached from the attraction face 6b of the electromagnetic coil 6 by the biasing force of the plate spring 43, and the armature 42 turns to be rotatable. Then, the wrap spring 3, connected to the connecting portion 41d of the driver 41 and the connecting portion 42c of the armature 42, biases itself toward the inner circumferential surface 2a of the pulley 2, and the first projecting portion 41b of the driver 41 is returned to the position indicated in FIG. 4A. Thus, because the driver 41 becomes rotatable, the biasing force of the wrap spring 3 actuates itself, and the length in the radial direction of the wrap spring is increased compared to the case where the water pump 1 is in the stopping state, and then the wrap spring 3 eventually contacts the inner circumferential surface 2a of the pulley 2, and the water pump 1 is actuated so as to be in the driving state.

According to the first embodiment, the controlling member 4 may switch at an appropriate timing the contacting state between the wrap spring 3 and the inner circumferential surface 2a of the pulley 2 to the engaging state or the disengaging state, accordingly the water pump may be switched to be the driving state or the stopping state. For example, the temperature of the engine serving as an internal-combustion engine is relatively low, the water pump 1 is turned to the stopping state, thereby executing the heating of the engine. In this configuration, cooling loss of the engine and friction loss of a piston and/or a cylinder may be reduced, accordingly a level of fuel economy may be increased. Further, because the cooling loss of the engine may be reduced, the temperature of the engine may be rapidly increased, accordingly incomplete combustion of the fuel may be reduced, at the same time a level of emission gas may be decreased.

A water pump 1a of a second embodiment will be explained in accordance with FIGS. 5 through 4.

A configuration of the water pump 1a of the second embodiment is basically similar to the water pump 1 of the first embodiment, and the differences therebetween will be emphasized in the following explanation of the second embodiment. Specifically, in the second embodiment, a position of the first bearing 11, a position of the electromagnetic coil 6 and a shape of the plate spring 43 in the first embodiment are changed, and the same numerals are used for the identical components in the first and second embodiments.

Figure 5:
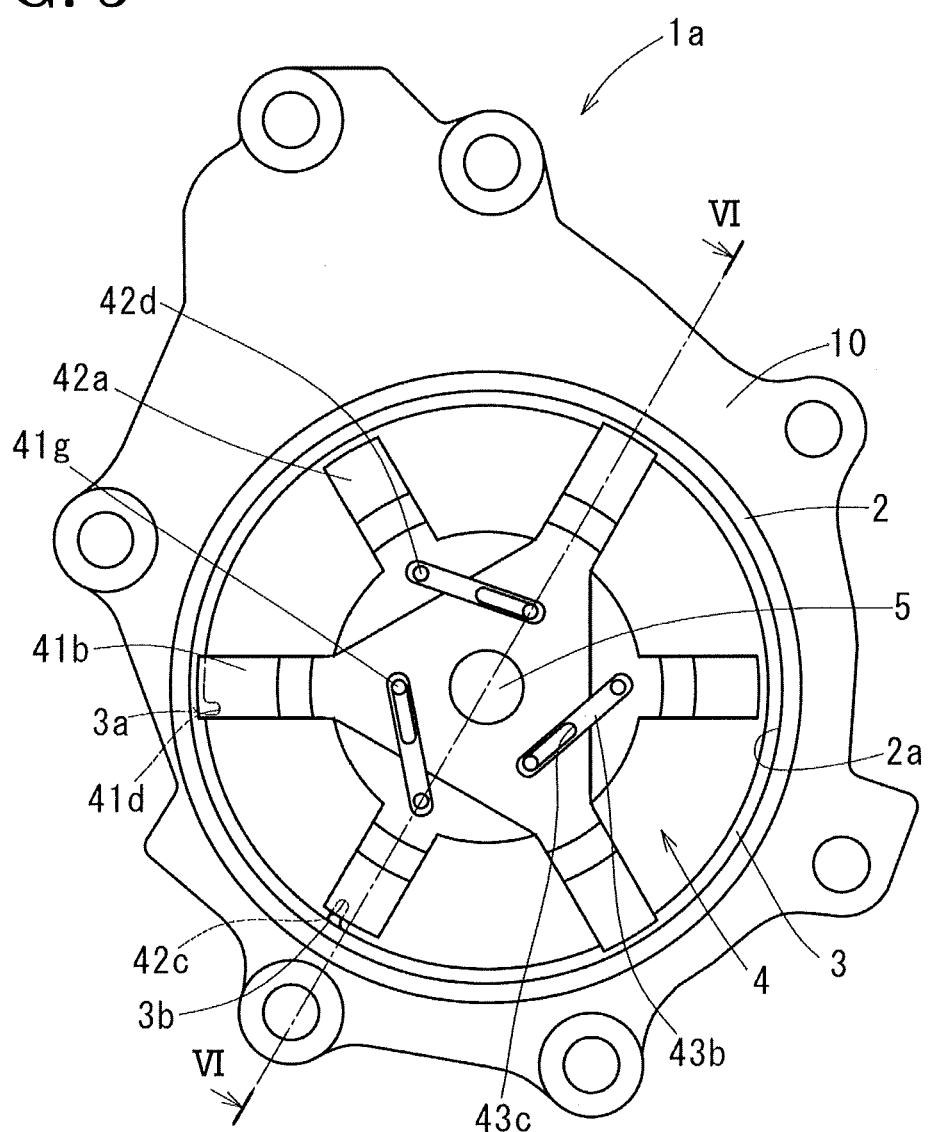
FIG. 5 is a detailed diagram indicating a configuration of each of components of a water pump of the second embodiment.
Figure 6:
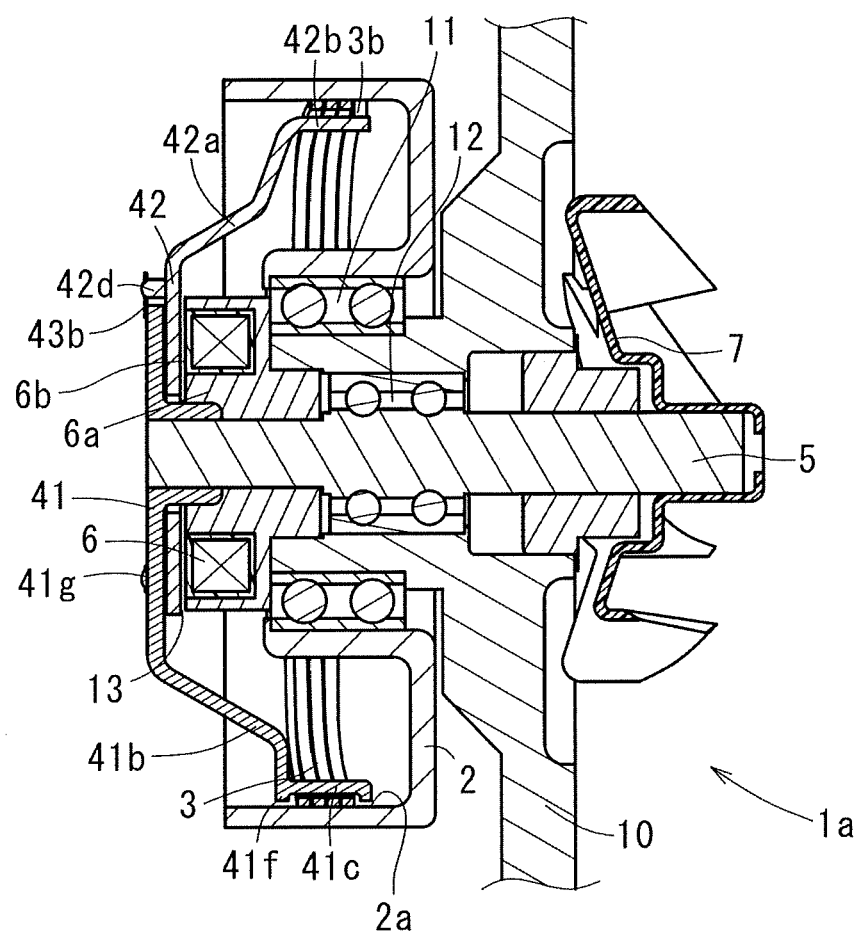
FIG. 6 is a cross sectional view of the water pump of the second embodiment, taken along VI-VI line in FIG. 5.

FIG. 5 is a detailed view indicating components of the water pump 1a. The water pump 1a includes a plate spring 43b provided at a protruding portion 41g of a driver 41 (FIG. 6) and a protruding portion 42d of an armature 42 (FIG. 6). The plate spring 43b is formed so as to include a longitudinal through hole 43c within which the protruding portion 41g is movable.

FIG. 6 is a cross section of the water pump 1a taken along a VI-VI line in FIG. 5. The water pump 1a includes a first bearing 11, provided between the pulley 2 and the pump housing 10, and an electromagnetic coil 6 provided between the first bearing 11 and the armature 42.

Figure 7A:
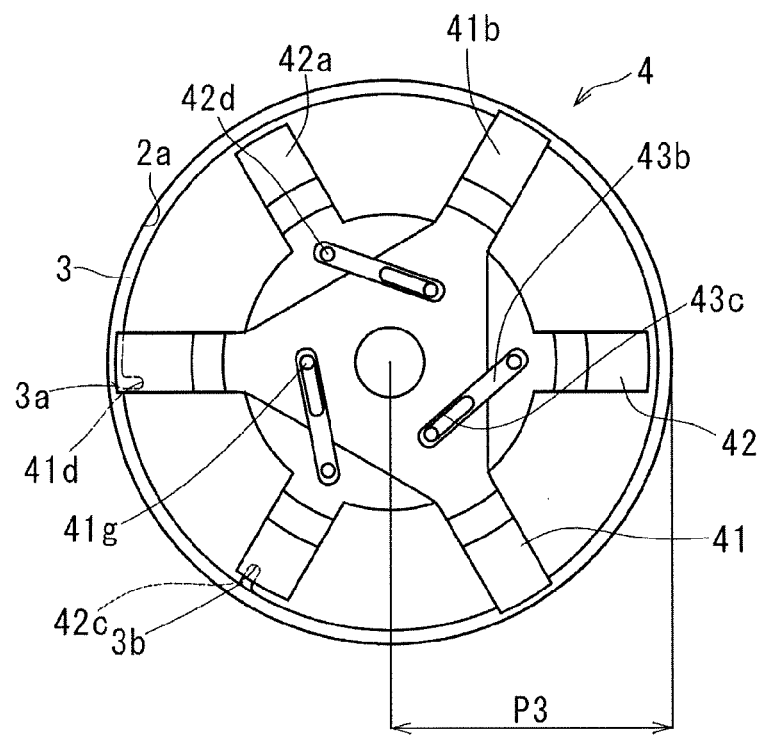
FIG. 7 is a detailed view indicating an actuation of a controlling member of the water pump of the second embodiment.
Figure 7B:
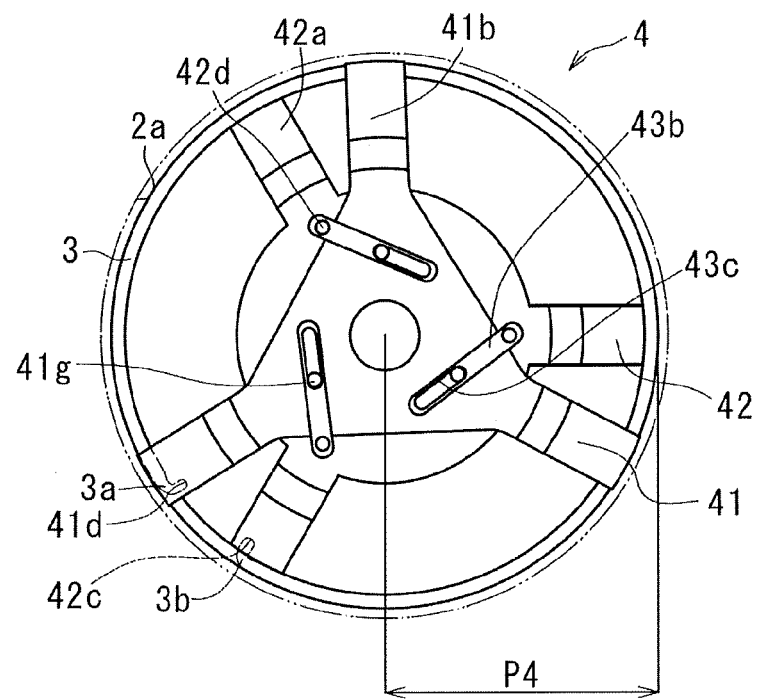

FIGS. 7A and 7B are detailed views indicating an actuation of the controlling member 4 of the water pump 1a. FIG. 7A indicates a state of the controlling member 4 when the water pump 1a is driven. When the water pump 1a is driven, both of the driver 41 and the armature 42 are rotatable, and the wrap spring 3 biases itself so as to extend toward an inner circumferential surface 2a of the pulley 2, accordingly the wrap spring 3 contacts the inner circumferential surface 2a of the pulley 2.

When the inner circumferential surface 2a contacts the wrap spring 3, the electromagnetic coil 6 attracts the armature 42 in order to control the rotational state of the armature 42, so that the rotational state of the driver 41 is also controlled. Because the rotational state of the driver 41 is controlled, the pressing force of the wrap spring 3 applied to the inner circumferential surface 2a of the pulley 2 is controlled, thereby controlling the contacting state between the inner circumferential surface 2a and the wrap spring 3.

FIG. 7B indicates a state of the controlling member 4 when the water pump 1a is stopped. When the water pump 1a is stopped, the electromagnetic coil 6 attracts and fixes the armature 42. Because the armature 42 connected to the plate spring 43b is fixed by the electromagnetic coil 6, the driver 41, the armature 42 and the plate spring 43b are frictionally contacting with each other. By virtue of the frictional force between the armature 42 and the plate spring 43b, the driver 41 may be fixed in a manner where the inner circumferential surface 2a is detached from the wrap spring 3. At this point, the driver 41 is fixed in a state where the connecting portion 41d is rotated toward the connecting portion 42c from the position indicated in FIG. 7A. Accordingly, the driver 41 and the armature 42 are fixed in such a way that the length in the radial direction of the wrap spring 3 is shrunk from P3 to P4 in FIGS. 7A and 7B.

The actuation of the water pump 1a of the second embodiment will be explained. The pulley 2, the driver 41 and the armature 42 are rotated in an anticlockwise direction in FIGS. 7A and 7B.

When the water pump 1a is driven (an initial state), the electromagnetic coil 6 is in a stopping state (non-energized state), and as indicated in FIG. 7A, the driver 41 and the armature 42 are rotatable, and the wrap spring 3 biases itself so as to extend toward the inner circumferential surface 2a of the pulley 2. In this state, the inner circumferential surface 2a of the pulley 2 contacts the wrap spring 3, and the rotation of the pulley 2 is transmitted to the driver 41. The rotation of the driver 41 is transmitted to the impeller 7 via the driven shaft 5. When the pulley 2 contacts the wrap spring 3, and the pulley 2 rotates in synchronization with the wrap spring 3, by virtue of a pressing force made by the biasing force of the wrap spring 3 and a centrifugal force acting at the wrap spring 3, the engagement between the pulley 2 and the wrap spring 3 may be strong. Further, in a case where the engagement between the pulley 2 and the wrap spring 3 is in the half-clutch state, although the wrap spring 3 rotates slidingly relative to the pulley 2, the rotation of the pulley 2 is transmitted to the wrap spring 3, accordingly a rotational force whose level is smaller than the rotation of the pulley 2 is transmitted to the impeller 7.

In order to turn the water pump 1a being in the driving state to the stopping state, the electromagnetic coil 6 is turned to an actuating state (an energized state) so as to attract the armature 42 by a magnetic force, so that the armature 42 is contacted to and fixed by the attraction face 6b of the electromagnetic coil 6. After the armature 42 is fixed, because the driver 41 and the wrap spring 3 keep rotating in accordance with an inertia force, as indicated in FIG. 7B, the first projecting portion 41b of the driver 41 being in the state indicated in FIG. 7A is rotated toward the second projecting portion 42a of the armature 42. Then, in a state where the second end portion 3b of the wrap spring 3 is fixed, because the first end portion 3a of the wrap spring 3 is rotated toward the second end portion 3b, a wounding angle of the wrap spring 3 is increased. Accordingly, as indicated in FIGS. 7A and 7B, the wrap spring 3 is detached from the inner circumferential surface 2a of the pulley 2 toward the rotating shaft of the pulley 2 by a distance that is equal to a difference between P3 and P4 in FIGS. 7A and 7B, accordingly the rotation of the pulley 2 is not transmitted to the impeller 7, thereby stopping the water pump 1a. Other actuations are similar to the first embodiment.

According to the second embodiment, because the first bearing 11 is positioned between the pulley 2 and the pump housing 10, a level of a load acting on the driven shaft 5 may be decreased compared to that in the first embodiment. Specifically, in the first embodiment, the first bearing 11 is provided between the pulley 2 and the first end portion of the driven shaft 5 being rotatably supported by the second bearing 12 as indicated in FIG. 2, while provided within the pump housing 10 in the second embodiment as indicated in FIG. 6. In other words, on one hand the pulley 2 of the first embodiment is rotatably supported by the pump housing 10, serving as a fixing member, via the second bearing 12, the driven shaft 5 and the first bearing 11, on the other hand the pulley 2 of the second embodiment is rotatably supported by the pump housing 10, serving as a fixing member, via only the first bearing 11. Accordingly, on one hand a force received by the pulley 2 in the first embodiment (a pulling force of a belt toward a driving device such as the internal-combustion engine) intensively acts on the first end portion of the driven shaft 5, on the other hand a force received by the pulley 2 in the second embodiment acts on the pump housing 10, serving as the fixing member, without passing through the driven shaft 5. In this configuration, because the force received by the pulley 2 in the second embodiment does not intensively act on a certain portion of the driven shaft 5, a level of frictional loss of the water pump 1 may be decreased, while decreasing frequency of a breakdown of the water pump 1.

According to the first and second embodiments, the driver 41 is formed with the plurality of the first projecting portions 41b, and the armature 42 is formed with the plurality of the second projecting portions 42a, however, the water pump of the first embodiment may be obtained in a configuration where at least one of the first projecting portions 41b is provided and at least one of the second projecting portions 42a is provided. In the configuration where at least one of the first projecting portions 41b is provided and at least one of the first projecting portions 42c is provided, the connecting portions 41d and 42c need to be additionally provided. Further, the end portions 41f of each of the wall portions 41c of the driver 41 is formed so as to extend toward the inner circumferential surface 2a of the pulley 2, however, the wall portions 41c may be formed in the same manner as the wall portions 42b of the armature 42, where end portions are not formed. In this configuration, the connecting portion 41d of the driver 41 and the connecting portion 42c of the armature 42 are located so as to be next to each other, however, the connecting portion 41d and the connecting portion 42c may not be next to each other.

A configuration where the air gap 13 is formed may be replaced by a configuration where a pulling spring is provided between the driver 41 and the armature 42 in order to attract the armature 42 toward the driver 41.

A range in which the length of the wrap spring 3 in the radial direction thereof can vary may be determined on the basis of a length of the first projecting portion 41b of the driver, a thickness of the wall portion 41c, a level of the biasing force of the wrap spring 3 and a spring length of the wrap spring 3. A number of windings of the wrap spring 3 may be changed on the basis of a thickness of the wrap spring 3, a distance between the connecting portion 41d of the driver 41 and the connecting portion 42c of the armature 42 in an axial direction of the driven shaft 5 and a position of the end portions 41f of the driver 41 in the axial direction of the driven shaft 5.

According to the embodiment, the water pump for a vehicle includes a pulley rotationally driven by an external force, a driven shaft driven to be rotatable independently from the pulley, an impeller to which a rotation of the driven shaft is transmitted, a wrap spring for pressing an inner circumferential surface of the pulley so as to be contactable and for rotating in order to transmit a rotation of the pulley to the driven shaft when the wrap spring contacts the inner circumferential surface of the pulley, the wrap spring being formed so as to be wound in a circumferential direction of the pulley and a control member for allowing the pulley and the wrap spring to come in contact with each other or to come out of contact from each other and for controlling a contacting state between the pulley and the wrap spring.

In this configuration, because of the controlling member for allowing the inner circumferential surface of the pulley and the wrap spring to come in contact with each other or to come out of contact from each other and for controlling a contacting state between the inner circumferential surface of the pulley and the wrap spring, the water pump may be driven or stopped by means of the controlling member. Further, in a case where the pulley and the wrap spring come in contact with each other, and the length of the wrap spring in the radial direction thereof is not controlled, by virtue of the pressing force made by a total force of the biasing force of the wrap spring and a centrifugal force acting on the wrap spring, the engagement between the wrap spring and the pulley may be strong. Thus, without using a large clutch mechanism used in the known water pump, according to the water pump disclosed here, sufficiently large torque may be transmitted to the impeller. Furthermore, in a case where the pulley and the wrap spring in contact with each other, and the length of the wrap spring in the radial direction thereof is controlled, the wrap spring may slidingly contact the pulley. Accordingly, the wrap spring may transmit a rotational force being smaller than a rotation force of the pulley to the impeller, thereby controlling an amount of a fluid outputted from the water pump.

The clutch mechanism mentioned here indicates the pulley and the wrap spring. When the pulley and the wrap spring come in contact with each other, the clutch mechanism is actuated, and when the pulley and the wrap spring come out of contact from each other, the clutch mechanism is not actuated.

According to the embodiment, the control member has a driver connected to a first end portion of the wrap spring and the driven shaft, a armature to which a second end portion of the wrap spring is connected and an electromagnetic coil for attracting the armature by use of a magnetic force, wherein the electromagnetic coil controls a length of the wrap spring in a radial direction of the wrap spring by attracting the armature.

In this configuration, by controlling the attracting force generated by the electromagnetic coil and acted on the armature, the length of the wrap spring in the radial direction thereof may be controlled at an any desired timing in order to allow the pulley and the wrap spring to come in contact with each other or to come out of contact from each other and to control the contacting state between the pulley and the wrap spring. Further, because the electromagnetic coil controls the length of the wrap spring in the radial direction thereof by applying a magnetic force to the armature, the water pump may not be structured in a complicated manner so as to be driven or stopped. Specifically, according to the water pump disclosed here, no additional structure may not be provided in order to control the length of the wrap spring in the radial direction thereof, thereby simply actuating the magnetic force on the armature. Furthermore, the electromagnetic coil may control the length of the wrap spring in the radial direction thereof by turning on or off the generation of the magnetic force, a level of responsibility of the water pump may be improved.

According to the embodiment, the electromagnetic coil is provided so as to face the armature, and the electromagnetic coil includes an attraction face at which an attracting force acting on the armature is generated in order to attract the armature in an axial direction of the driven shaft.

In this configuration, because the attraction face of the electromagnetic coil is provided so as to face the armature, the attracting force may be effectively acted to the armature. Thus, because the attracting force generated by the electromagnetic coil may be effectively acted on the armature, the electromagnetic coil may be downsized and may use much less power.

According to the embodiment, the wrap spring contacts the pulley when the electromagnetic coil is in a stopping state.

In this configuration, even when the electromagnetic coil cannot be actuated, the rotation of the pulley may be transmitted to the driven shaft via the wrap spring contacting to the pulley, and the rotation is eventually transmitted to the impeller. Thus, in a case where the length of the wrap spring in the radial direction of the wrap spring is not controlled, because the wrap spring is pressed toward the inner circumferential surface of the pulley by use of the biasing force of the wrap spring itself, the inner circumferential surface of the pulley and the wrap spring come in contact with each other. Accordingly, even when the controlling member cannot control the length of the wrap spring in the radial direction of the wrap spring, the water pump for the vehicle may be driven.

According to the embodiment, the electromagnetic coil includes an attraction face for applying an attraction force from the electromagnetic coil to the armature, an entire surface of the attraction face facing the armature.

According to the embodiment, a water pump for a vehicle includes a pulley rotationally driven by an external force, a driven shaft driven to be rotatable independently from the pulley, an impeller to which a rotation of the driven shaft is transmitted, a wrap spring for pressing an inner circumferential surface of the pulley so as to transmit a rotation of the pulley to the driven shaft, and a controlling member for controlling a pressing force of the wrap spring applied to the inner circumferential surface of the pulley, wherein the wrap spring is formed so as to be wound in a circumferential direction of the pulley, and the controlling member changes a length of the wrap spring in a radial direction of the wrap spring in order to allow the inner circumferential surface of the pulley and the wrap spring to come in contact with each other or to come out of contact from each other.

In this configuration, the impeller is rotated when the controlling member controls the wrap spring so as to press the inner circumferential surface of the pulley, and the impeller is not rotated when the controlling member controls the wrap spring so as not to press the inner circumferential surface of the pulley. Because the water pump is actuated or stopped by means of the wrap spring being controlled so as to press or not to press the inner circumferential surface of the pulley, the wrap spring may be housed within the pulley (inside of the inner circumferential surface of the pulley), thereby downsizing the water pump.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A water pump for a vehicle, comprising:
a power transmitting member rotationally driven by an external force;
a driven shaft driven to be rotatable independently from the power transmitting member;
an impeller to which a rotation of the driven shaft is transmitted;
a biasing member which presses an inner circumferential surface of the power transmitting member so as to be contactable and for rotating in order to transmit a rotation of the power transmitting member to the driven shaft when the biasing member contacts the inner circumferential surface of the power transmitting member, the biasing member being formed so as to be wound in a circumferential direction of the power transmitting member;
a control member which allows the power transmitting member and the biasing member to come in contact with each other or to come out of contact from each other and for controlling a contacting state between the power transmitting member and the biasing member;
the control member including a driver connected to a first end portion of the biasing member and the driven shaft, a magnetically-attracted portion to which a second end portion of the biasing member is connected, and a driving portion which attracts the magnetically-attracted portion by magnetic force, the driving portion controlling a length of the biasing member in a radial direction of the biasing member by attracting the magnetically-attracted portion;
a plate spring positioned between the magnetically-attracted portion and the driver, the plate spring biasing the magnetically-attracted portion away from the driving portion so that an air gap exists between the magnetically-attracted portion and an acting surface of the driving portion; and
the driving portion attracting the magnetically-attracted portion by the magnetic force so that the magnetically-attracted portion contacts the acting surface of the driving portion.

2. The water pump for the vehicle according to claim 1, wherein the driving portion faces the magnetically-attracted portion, and the driving portion attracts the magnetically-attracted portion in an axial direction of the driven shaft.

3. The water pump for the vehicle according to claim 2, wherein an entirety of the acting surface faces the magnetically-attracted portion.

4. The water pump for the vehicle according to claim 2, wherein the driving portion is a coil and is configured to be energized in an actuating state and non-energized in a stopping state, and wherein the biasing member contacts the power transmitting member when the driving portion is in the stopping state.

5. The water pump for the vehicle according to claim 4, wherein an entirety of the acting surface faces the magnetically-attracted portion.

6. The water pump for the vehicle according to claim 1, wherein the driving portion is a coil and is configured to be energized in an actuating state and non-energized in a stopping state, and wherein the biasing member contacts the power transmitting member when the driving portion is in the stopping state.

7. The water pump for the vehicle according to claim 6, wherein an entirety of the acting surface faces the magnetically-attracted portion.

8. The water pump for the vehicle according to claim 1, wherein an entirety of the acting surface faces the magnetically-attracted portion.

9. The water pump for the vehicle according to claim 1, wherein the magnetically-attracted portion includes a plurality of circumferentially spaced apart and radially outwardly extending projecting portions that extend toward an inner surface of the power transmitting member.

10. The water pump for the vehicle according to claim 1, wherein the driver includes a plurality of circumferentially spaced apart and radially outwardly extending projecting portions that extend toward an inner surface of the power transmitting member.

11. A water pump for a vehicle, comprising:
- a power transmitting member rotationally driven by an external force;
- a driven shaft driven to be rotatable independently from the power transmitting member;
- an impeller to which a rotation of the driven shaft is transmitted;
- a biasing member which presses an inner circumferential surface of the power transmitting member so as to transmit a rotation of the power transmitting member to the driven shaft;
- a controlling member which controls a pressing force of the biasing member applied to the inner circumferential surface of the power transmitting member, wherein the biasing member is formed so as to be wound in a circumferential direction of the power transmitting member, and the controlling member changes a length of the biasing member in a radial direction of the biasing member in order to allow the inner circumferential surface of the power transmitting member and the biasing member to come in contact with each other or to come out of contact from each other member;
- the controlling member including a driver connected to a first end portion of the biasing member and the driven shaft, a magnetically-attracted portion to which a second end portion of the biasing member is connected, and a driving portion which attracts the magnetically-attracted portion by magnetic force, the driving portion controlling a length of the biasing member in a radial direction of the biasing member by attracting the magnetically-attracted portion;
- a plate spring positioned between the magnetically-attracted portion and the driver, the plate spring biasing the magnetically-attracted portion away from the driving portion so that an air gap exists between the magnetically-attracted portion and an acting surface of the driving portion; and
- the driving portion attracting the magnetically-attracted portion by the magnetic force so that the magnetically-attracted portion contacts the acting surface of the driving portion.

12. The water pump for the vehicle according to claim 11, wherein the magnetically-attracted portion includes a plurality of circumferentially spaced apart and radially outwardly extending projecting portions that extend toward an inner surface of the power transmitting member.

13. The water pump for the vehicle according to claim 11, wherein the driving portion is configured to be energized in an actuating state and non-energized in a stopping state, and when the driving portion is in the actuating state an entirety of the acting surface contacts the magnetically-attracted portion.

14. The water pump for the vehicle according to claim 11, wherein the driver includes a plurality of circumferentially spaced apart and radially outwardly extending projecting portions that extend toward an inner surface of the power transmitting member.

* * * * *